(12) United States Patent
Huber et al.

(10) Patent No.: US 8,085,720 B2
(45) Date of Patent: Dec. 27, 2011

(54) CHANNEL ELEMENT PACKING AND REPACKING

(75) Inventors: Kurt Huber, Kennesaw, GA (US);
Daniel Edwards, Duluth, GA (US);
Robert Taylor, Roswell, GA (US);
Arthur Brisebois, Cumming, GA (US);
Ramzi Barghouthi, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1007 days.

(21) Appl. No.: 12/019,935

(22) Filed: Jan. 25, 2008

(65) Prior Publication Data
US 2009/0191884 A1 Jul. 30, 2009

(51) Int. Cl.
*H04W 4/00* (2009.01)
(52) U.S. Cl. ........................................ 370/329; 455/450
(58) Field of Classification Search .................. 370/329, 370/338, 431, 437, 464, 468, 487; 455/450
See application file for complete search history.

(56) References Cited

U.S. PATENT DOCUMENTS

| | | | |
|---|---|---|---|
| 7,266,122 B1 * | 9/2007 | Hogg et al. | 370/395.41 |
| 2002/0154705 A1 * | 10/2002 | Walton et al. | 375/267 |
| 2006/0093067 A1 * | 5/2006 | Jalali et al. | 375/299 |
| 2007/0047632 A1 * | 3/2007 | Tung | 375/222 |
| 2008/0100508 A1 * | 5/2008 | Beason et al. | 342/357.09 |

* cited by examiner

*Primary Examiner* — Brian Nguyen

(57) ABSTRACT

Providing for efficient utilization of channel element device ladder (CEDL) resources is described herein. By way of example, a received data request can be packed in a first portion of the CEDL and a received voice request can be packed in a second portion of the CEDL. Subsequent requests can be assigned to contiguous channel elements (CEs) of the CEDL within the first or second portion, as suitable. In addition, non-assigned CEs can be maintained in a third portion of the CEDL, by packing requests initially from opposite ends of the first and second portion, and be re-packing dropped traffic within the CEDL. Accordingly, the subject disclosure provides for efficient utilization of CEDL resources both for incoming voice traffic requests and incoming data traffic requests, by packing and maintaining data, voice and un-assigned CEs in contiguous portions of the CEDL.

26 Claims, 12 Drawing Sheets

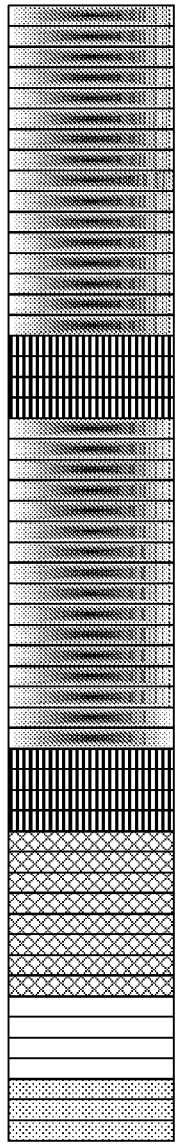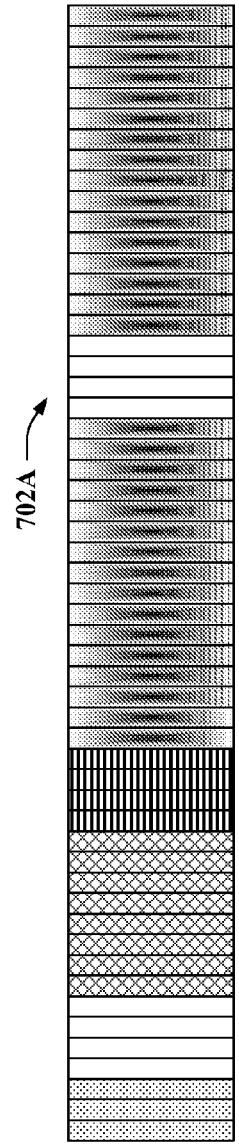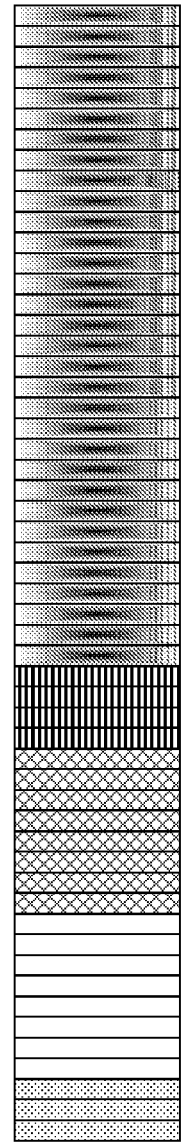
FIG. 7
FIG. 7A
FIG. 7B

CHANNEL ELEMENT PACKING AND REPACKING

BACKGROUND

As numbers of mobile communication device users and mobile service subscribers continue to increase, the demand placed on mobile network components to provide remote communication services for such devices and subscribers increases commensurately. To compound this problem, today's mobile devices (e.g., mobile phones, personal digital assistants (PDAs), etc.) can be utilized as full-service computing mechanisms. For example, many of the most recent and advanced mobile devices can be associated with word processing software, web browsing software, electronic mail software, accounting software, and various other types of software. In general, applications heretofore available only by way of computing devices and/or Internet protocol (IP) based network devices are now available on such mobile devices. This expansion in capability of mobile devices has also lead to advancements in processing capability of mobile network resources. As an example, mobile base stations and control components have begun to process voice and data traffic concurrently on a single processing architecture.

The rapid growth of the telecommunications industry has fueled a strong competition for market share in mobile-IP communication devices and communication service plans. Because of such competition, mobile network providers have created packet based data networks that can provide IP access to the Internet and other IP-based network resources and applications (e.g., e-mail, web browsing, and so on). Accordingly, a mobile handset or the like can provide access to a rich assortment of shared computing applications and data resources available via such networks. However, not all such packet based data communications utilize a common data rate. On the contrary, various service providers provide for a range of bandwidths or data rates for IP-based subscriber traffic. The added bandwidth, however, can cause some complications in traffic processing, as voice calls and data calls compete for common mobile network processing resources. Accordingly, improvements can be helpful to preserve efficient processing of mobile communication traffic.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject disclosure, in one or more aspects thereof, provides for efficient utilization of channel element device ladder (CEDL) resources by packing voice requests in a first portion of the CEDL and packing data requests in a second portion of the CEDL. Subsequent data requests can be assigned to contiguous channel elements (CEs) within the second portion of the CEDL to pack the data requests efficiently within the CEDL. Subsequent voice requests can be assigned to contiguous CEs within the first portion of the CEDL, and un-assigned CEs can be maintained at a middle area of the CEDL between the first portion and second portion. As a number of voice or data requests increases, additional requests can be assigned to CEs of the middle area that are adjacent to assigned CEs of the first or second portion, as suitable. For instance, a subsequent data request can be assigned to one or more available CEs closest to the second portion (and farthest from assigned CEs of the first portion), and subsequent voice requests can be assigned to an available CE(s) closest to the first portion. Accordingly, the subject disclosure provides for efficient packing of data and voice requests in a single CEDL, in a manner that preservers efficient and contiguous assignment of such requests to hardware resources managed by the CEDL.

According to one or more additional aspects, provided is a mechanism to repack voice and/or data requests within a CEDL to maintain contiguous assignment of processing resources. If one or more CEs of the CEDL become available for assignment, and such CEs are adjacent to other CEs processing requests, the requests can be shifted within the CEDL as a function of type of request and current position in the CEDL. For instance, data requests can be shifted to available CEs within the CEDL that are closer to a portion of the CEDL allocated to data traffic. Likewise, voice requests can be shifted to available CEs within the CEDL that are closer to a portion of the CEDL allocated to voice traffic. Accordingly, as CEs become freed up (e.g., as calls drop out, are terminated, etc.), concurrent requests can be shifted within the CEDL to maintain a contiguous group of CEs processing all data traffic and a contiguous group of CEs processing all voice traffic. As a result, CEs within such contiguous groups that become freed up can be re-assigned to current requests so that available CEs can be maintained in a third contiguous portion of the CEDL (e.g., between the groups of CEs assigned to voice and data traffic). Such an arrangement can increase a likelihood that incoming data traffic can be handled by the CEDL, utilizing a greater degree of CEDL resources at any given time.

According to some aspects of the claimed subject matter, one or more CEs allocated to voice or to data traffic can be temporarily designated to a different type of traffic as demand for such type of traffic spikes. For instance, if a higher than usual volume of data traffic occurs, one or more CEs allocated to voice traffic, if any, can be designated for data traffic and utilized to process data traffic requests, and vice versa. Accordingly, a data/voice allocation scheme can be handled in a flexible manner to allow for concurrent increases in voice and/or data traffic volume, as suitable.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIGS. 7, 7A and 7B depict an example of re-packing a CEDL to maintain contiguity of voice, data and/or un-assigned CEs according to further aspects.

DETAILED DESCRIPTION

Figure 1:
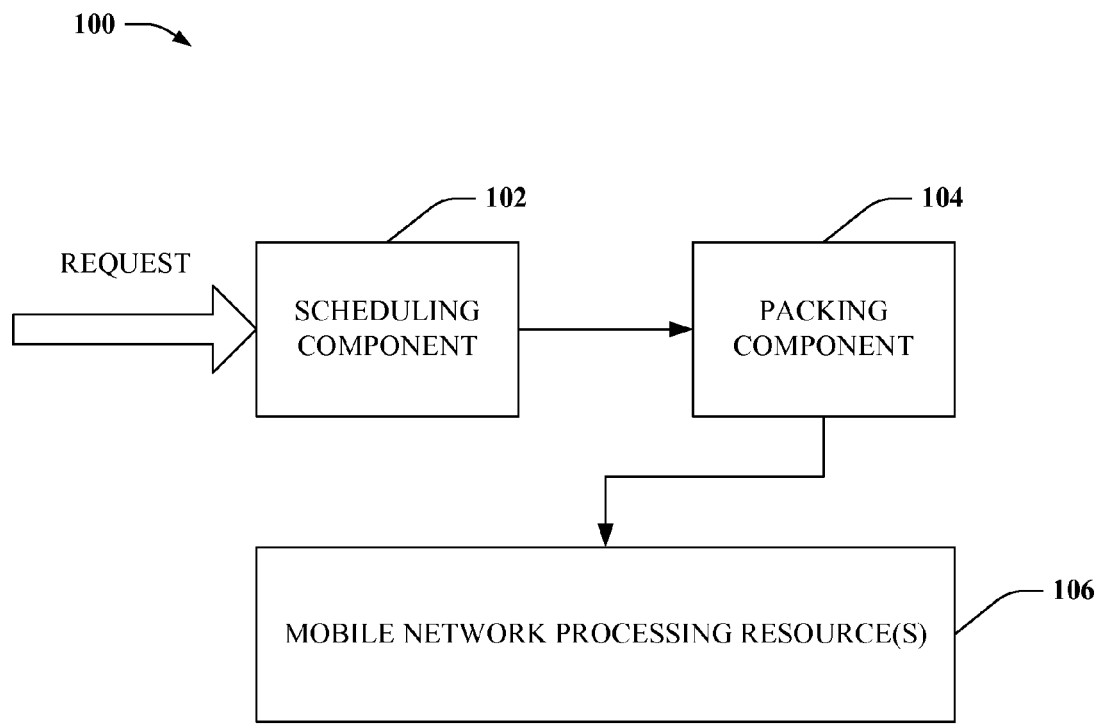
FIG. 1 illustrates a block diagram of a sample system that provides efficient management of channel element device ladder (CEDL) resources according to some aspects disclosed herein.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Providing for packing and re-packing of mobile communication within a multi-functional channel element device ladder (CEDL) as a function of mobile communication traffic type is described herein. A CEDL is a mechanism for organizing processing resources of components of a mobile communication network. For instance, mobile network components such as a base station (BS), mobile switching center (MSC), gateway mobile switching center (GMSC), serving GPRS support node (SGSN), gateway GPRS support node (GGSN), and the like, typically process information related to communication devices utilizing a mobile network. In addition, such information can change dynamically as a mobile device moves between or within mobile cells, as an air link quality parameter changes (e.g., due to range, dynamic interference, load on the base station, and so on), as a hand-off is conducted, or the like. These as well as other functions of a mobile network can be performed at network components (e.g., base station, GMSC, GGSN, etc.) utilizing processing resources situated at those components. Because such components are designed to accommodate many mobile devices concurrently, network functions performed for each such device must be scheduled to those processing resources in parallel. As a result, efficient utilization of processing resources can lower hardware costs and result in more efficient network functionality.

A CEDL is a management arrangement that represents a predetermined amount of processing capability of processing hardware of a mobile network component. The processing hardware can typically include multiple processing devices (e.g., single and/or multi-core processor chips) linked by a processing platform that couples the multiple processing devices with at least a control module (as well as multiple other components, such as memory, communication bus, and so on, see e.g., FIG. 11, infra). The control module can assign traffic request threads (e.g., circuit-switched voice traffic or packet-switched data traffic) to one or more of the processing devices. Such threads can therefore be handled concurrently with other threads in a parallel processing arrangement. The CEDL is analogous to a processing platform that integrates multiple processing devices into the parallel processing arrangement. The processing devices are analogous to rungs of the CEDL, and are typically termed channel elements (CEs). Each CE can generally be a separate hardware processing device, although this is not a requirement, and multiple CEs can reside on a single multi-threading and/or multi-core processor, for instance.

As a non-limiting example for illustrative purposes, a single processing device (e.g., single core processor) provides one unit of processing resource, or one channel element (CE), for a mobile base station CEDL. A single request can be assigned to one or more such CEs that are interconnected by a CEDL processing platform. Typically, mobile environment processing threads are scheduled first to available CEs at one end of a CEDL, and then subsequent processing threads into contiguous CEs along the CEDL. If a processing thread requires more CEs than an available number of contiguous CEs on the CEDL, then such a thread generally is assigned to another CEDL having a sufficient number of contiguous CEs to process the thread. Such threads can be low demand threads taking up only one or a few CEs of the CEDL, or can be relatively high demand threads that require a larger number of CEs for processing. (E.g., see FIG. 5 for a depiction of a full CEDL having several low demand threads drop out). Typically, voice calls only require one or a few CEs to process, whereas data threads can require one, two, four, eight, sixteen, etc., CEs to process a single data thread, depending on a bandwidth and/or bit-rate associated with a particular data thread.

Although some platforms process voice traffic threads and data traffic threads on separate CEDLs, recently processing architectures have been adapted to allow a single CEDL to process both voice and data traffic. Voice traffic typically utilizes only a single CE, whereas data traffic can utilize multiple CEs concurrently. The data traffic is generally restrained to being assigned to multiple contiguous CEs, however, so that proper decoding can occur at a terminating end of a data signal. One problem associated with assigning data traffic to a CEDL is that such traffic can require varying numbers of CEs due to varying bandwidths/bit rates offered to data traffic subscribers. Consequently, CEs of a single CEDL can become fragmented as data traffic calls utilizing varying numbers of contiguous CEs terminate and/or drop out. This problem is compounded when voice traffic is added to the same CEDL, as such calls typically involve only a single CE at a time; as voice calls drop out, single CEs become available at various positions along the CEDL. However, because voice CEs are typically assigned to a next available position in a CEDL, the position of such voice calls within the CEDL can be random (e.g., as voice subscribers randomly initiate calls). Thus, single available CE positions can randomly occur within the CEDL when voice calls terminate.

The subject disclosure provides for an intelligent mechanism for packing voice and data traffic to a CEDL in a manner that reduces fragmentation of available CEs of the CEDL. Voice traffic can be assigned to one portion of the CEDL, and data traffic can be assigned to a second portion. As a specific example, voice traffic can be assigned to CEs at a first end of the CEDL (e.g., top end, left end, etc.) and data traffic can be assigned to contiguous CEs starting from a second end of the CEDL, opposite the first end (e.g., bottom end, right end, etc.). Further, unassigned CEs can be maintained in a third portion of the CEDL, in between CEs assigned to data traffic and CEs assigned to voice traffic, for instance. As a result of this packing mechanism, when voice traffic calls drop out, they won't fragment contiguous assignment of CEs at the data portion of the CEDL, and vice versa. By maintaining contiguity of assigned and unassigned CEs, it is more likely that the CEDL can process an incoming data call that requires multiple contiguous CEs.

Also disclosed is a mechanism for repacking assigned voice and data traffic within a CEDL to preserve contiguity of assigned and un-assigned CEs. When calls drop out, whether associated with voice traffic or data traffic, traffic assigned to CEs of the CEDL can be repacked within the CEDL. Voice traffic can be re-assigned within a portion of the CEDL to maintain a contiguous group of CEs processing voice traffic. Likewise, data traffic can be re-assigned within a second portion of the CEDL to maintain a second contiguous group of CEs processing data traffic. Accordingly, un-assigned CEs can be dynamically redistributed into a third portion of the CEDL (e.g., between the first and second portion). Because data traffic can require multiple contiguous CEs to process higher bandwidth traffic (e.g., as compared with voice traffic), maintaining un-assigned CEs in a contiguous portion of the CEDL can help to ensure that incoming data traffic can be processed by the CEDL.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 depicts a block diagram of an example system 100 that provides efficient assignment of data and/or voice traffic to mobile network processing resources 106. Such resources 106 can be modeled by a CEDL having multiple contiguous CEs, as described herein. System 100 can include a scheduling component 102 that can receive a request to process voice and/or data traffic related at least in part to a wireless mobile device communication. The voice and/or data traffic can be associated with a circuit switched transfer of information, or a packet-switched transfer of information, or a combined circuit and packet switched transfer of information (e.g., where legacy circuit-switched data is translated into packet-switched data by network components, or vice versa). In addition, the traffic can be associated with a communication between two mobile device (e.g., cell phones, multi-mode phones, PDAs, etc), a mobile device and a fixed device (e.g., desktop computer, network server, and so on), or between two fixed devices utilizing components of a mobile network to process at least a portion of the traffic.

System 100 can further include a packing component 104 that assigns a request received by scheduling component 102 to a first portion of a CEDL (106) allocated substantially to voice traffic if the request involves a voice communication. In addition, packing component 104 can assign the request received by scheduling component 102 to a second portion of the CEDL (106) allocated substantially to data traffic if the request involves a data communication. As a result, voice traffic and data traffic can be assigned to separate portions of the CEDL. Moreover, un-assigned traffic can be maintained at a third portion of the CEDL.

Figure 6:
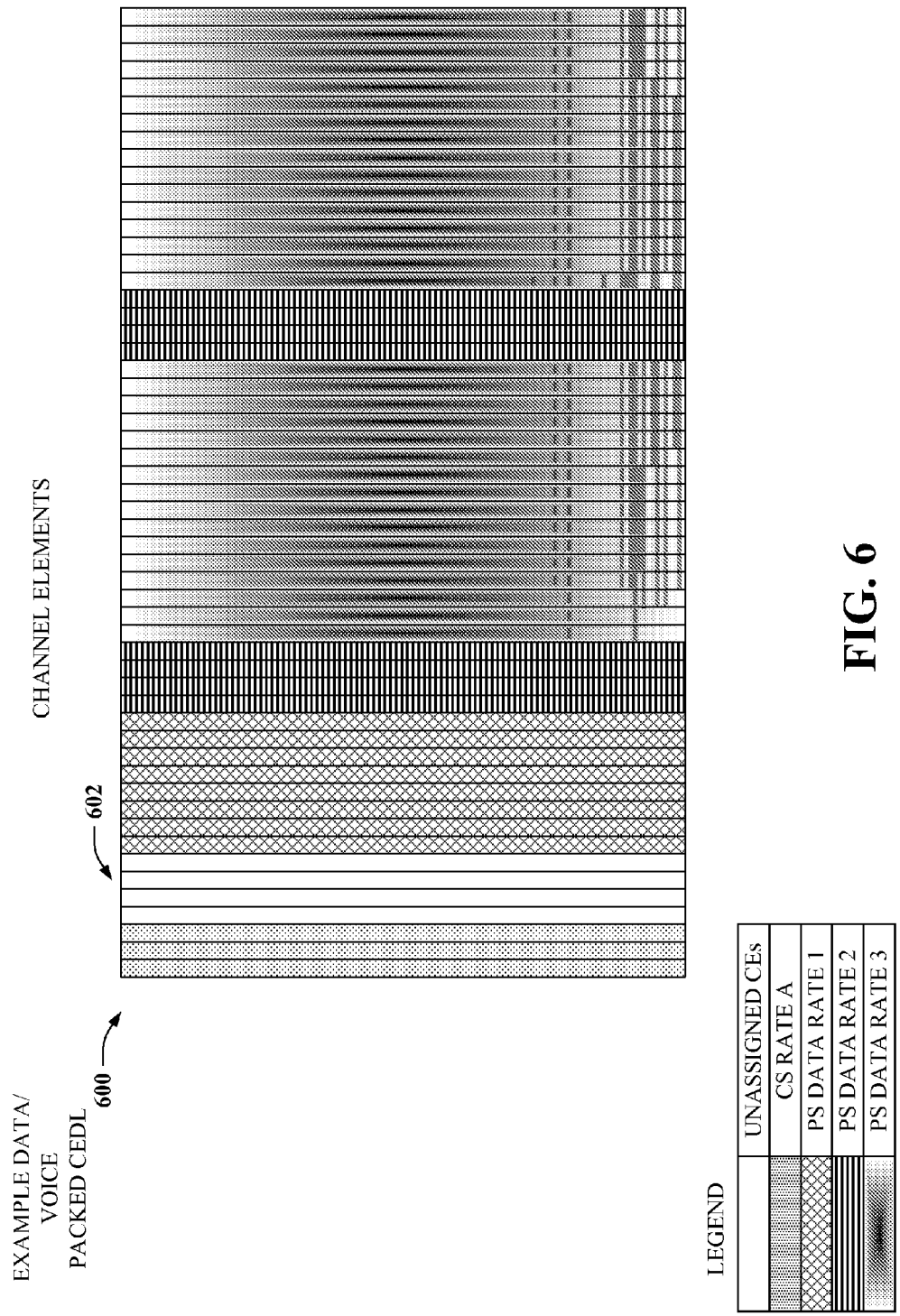
FIG. 6 depicts a further example CEDL exhibiting assignment packing as a function of traffic type according to some aspects.

As a particular example to describe the foregoing, a single CEDL includes 55 contiguous CEs (e.g., see FIG. 6, infra). Each CE represents a fraction of the processing hardware of the CEDL. In addition, each CE can process a single voice traffic request, or a fraction of a data traffic request. Further, data traffic requests having a guaranteed bandwidth/bit rate require a number of CEs that can process the required bandwidth/bit rate. Data traffic requests having a best effort bandwidth/bit rate can instead require as many available CEs to process the request up to a number of CEs required for the best effort bandwidth/bit rate.

As a more specific example of the foregoing, if each CE represents 12.5 megahertz (Mhz) of processing bandwidth, and a data traffic request requires 50 Mhz of processing bandwidth, packing component 104 assigns the data traffic request to four CEs in order to meet the 50 Mhz bandwidth requirement. In addition to the foregoing, the four CEs generally must be contiguous in order for proper decoding associated with the data traffic to occur. As a result, by scheduling voice traffic requests to contiguous CEs of a first portion of the CEDL, and data traffic requests to contiguous CEs of a second portion of the CEDL, un-assigned CEs can also be maintained in a contiguous third portion of the CEDL (e.g., see FIG. 6). Thus, as long as four contiguous CEs are available in the CEDL, the data traffic request described above can be processed by the CEDL. Alternatively, up to four separate voice traffic requests can also be processed by the CEDL. If, however, the four available CEs were not contiguous, the four voice traffic requests could be processed by the CEDL, but the 50 Mhz data traffic request could not be processed. Instead, the four CEs would remain un-assigned, and the data traffic request would be scheduled to another CEDL, or queued or rejected if no other CEDLs are available.

According to some embodiments, a first portion of the CEDL (e.g., left side) allocated to voice traffic can be separated from a second portion of the CEDL (e.g., right side) allocated to data traffic by at least one CE that is not allocated to either voice or data traffic. In addition, packing component 104 can assign a voice data request to an available CE of the first portion that is furthest within the CEDL from the second portion (e.g., a first available CE furthest to the left side of the CEDL). Likewise, packing component 104 can assign a data traffic request to a contiguous number of available CEs that are furthest within the CEDL from the first portion (e.g., furthest to the right side of the CEDL). As additional voice and/or data traffic requests are received by scheduling component 102, packing component 104 can assign such requests to contiguous CEs of the CEDL within the respective portions (e.g., first portion for voice traffic and second portion for data traffic) apportioned for such traffic, as described herein.

In addition to the foregoing, packing component 104 could assign a request to the at least one CE that is not allocated to either voice or data traffic. For instance, if the first portion of the CEDL is full (e.g., all CEs of the first portion are processing other voice requests), a subsequently received voice request could be scheduled to the at least one CE. Likewise, if available CEs of the second portion are insufficient to satisfy requirements of a subsequently received data request, at least a portion of such data request could be scheduled to the at least one CE.

According to further embodiments, packing component 104 can assign a voice request to a CE of the second portion and/or at least a portion of a data request to one or more CEs of the first portion to process a concurrent volume of data/voice requests. For instance, if a number of received voice requests exceeds a number of CEs of the first portion (and, e.g., a number of un-allocated CEs if any), available CEs of the second portion can be assigned to process one or more of the voice requests. Likewise, if data rate requirements of received data requests exceeds a data rate capability of CEs of the second portion (and, e.g., data rate capability of un-allocated CEs if any), available CEs of the first portion can be assigned to process at least a portion of a data request, multiple data requests, and so on. As described, system 100 provides for intelligent packing of voice and data requests into at least one CEDL in a manner that can segregate processing of data and voice requests to preserve contiguity of un-assigned portions of the CEDL.

Figure 2:
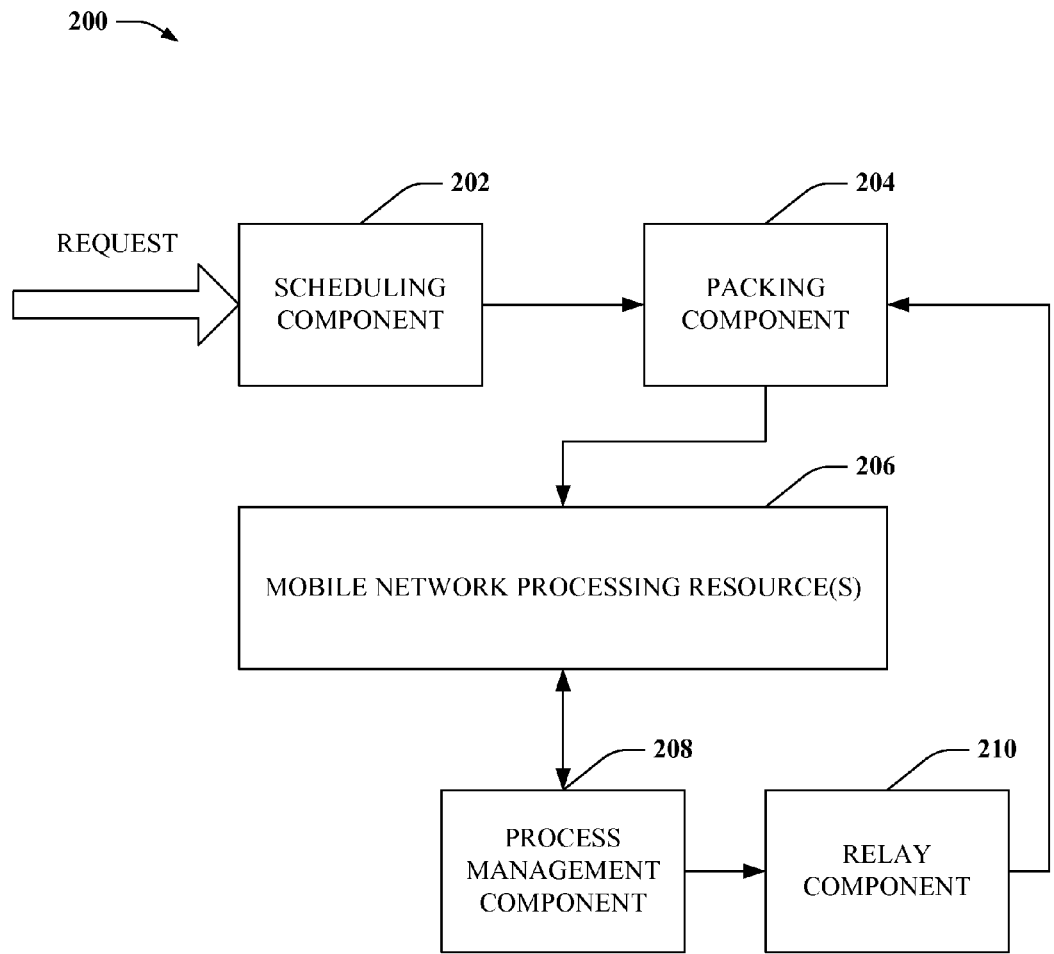
FIG. 2 depicts a block diagram of an example system that identifies available CEDL resources and can re-allocate traffic to such resources.

FIG. 2 depicts a block diagram of an example system 200 that identifies available CEDL resources (206) and can re-allocate traffic to such resources. System 200 can include a scheduling component 202 that receive data and/or voice traffic requests and a packing component 204 that can assign received voice requests to a first portion of a CEDL (206) and received data requests to a second portion of the CEDL (206). Assignment of requests can be such that un-assigned portions of the CEDL (206) are maintained in a contiguous fashion in a third portion of the CEDL (206). Accordingly, data traffic requiring multiple contiguous CEs of the CEDL (206) is more likely to be processed by the CEDL (206) so long as a sufficient number of available CEs exist.

System 200 can also include a process management component 208 that identifies one or more CEs within the CEDL (206), previously assigned to process a communication, which become available after the communication is completed or is otherwise terminated. As an example for illustrative purposes, the first four CEs from a left side of a CEDL (206) are assigned to process four voice communications. If the voice communication assigned to the second left-most CE of the CEDL terminates, drops out, etc., such CE can become available for processing further communication. Process management component 208 can monitor processing activity of CEs in the CEDL (206) to determine which CEs become available for processing other requests. Alternatively, or in addition, process management component 208 can obtain an indication that such CEs have become available (e.g., from the CE(s) itself, from a memory flag(s) allocated to the CE or to a group of CEs and updated by such CE(s) to indicate the CE(s) is un-assigned, or from some other memory control component associated with a shared mobile network processing architecture, or the like). Once process management component 208 identifies the one or more CEs that have become available, an identity, location, address, and/or the like of the available CE(s), as well as traffic type (e.g., voice or data) being processed by contiguous CEs, can be forwarded to relay component 208 for further handling.

System 200 can also include a relay component 210 that can receive information pertaining to previously assigned CEs that have become available to process traffic, and forward such information to packing component 204. The information pertaining to the previously assigned CEs can include identification information (e.g., a distinct identifier such as a unique number, bit or group of bits, and so on) and/or location information (e.g., an address or location, etc., on a shared processing architecture/CEDL 206), or the like. In addition, the information pertaining to previously assigned CEs can include a type of traffic (e.g., data or voice) being processed by CEs contiguous to the previously assigned CEs, whether the CEs are allocated to a particular traffic type, and so on. Accordingly, upon receiving such information packing component 204 can not only identify and locate the available CEs, a type of traffic to be assigned to such CEs, as described herein, can be determined as well.

To continue the above example pertaining to four contiguous CEs assigned to four voice traffic requests, the second-most CE from the left of the CEDL (206) that becomes available is contiguous to two CEs that are also processing voice traffic. Such information can be identified by process management component 208 and delivered to packing component 210 by relay component 206. Accordingly, packing component 208 can determine that the now-available CE can concurrently process only voice traffic or single CE data traffic (e.g., because there are no contiguous CEs that are also available to handle higher data rate traffic). Alternatively, or in addition, a type of traffic that the available CE is allocated to can be provided to the packing component 204. Thus, packing component 204 can determine that the CE should remain un-assigned until a subsequent voice request is received. By gathering and distributing information pertaining to available CEs, system 200 can schedule a received request(s) to a portion of the CEDL (206) that had already been scheduled a previous request, increasing efficiency of the CEDL.

Figure 3:
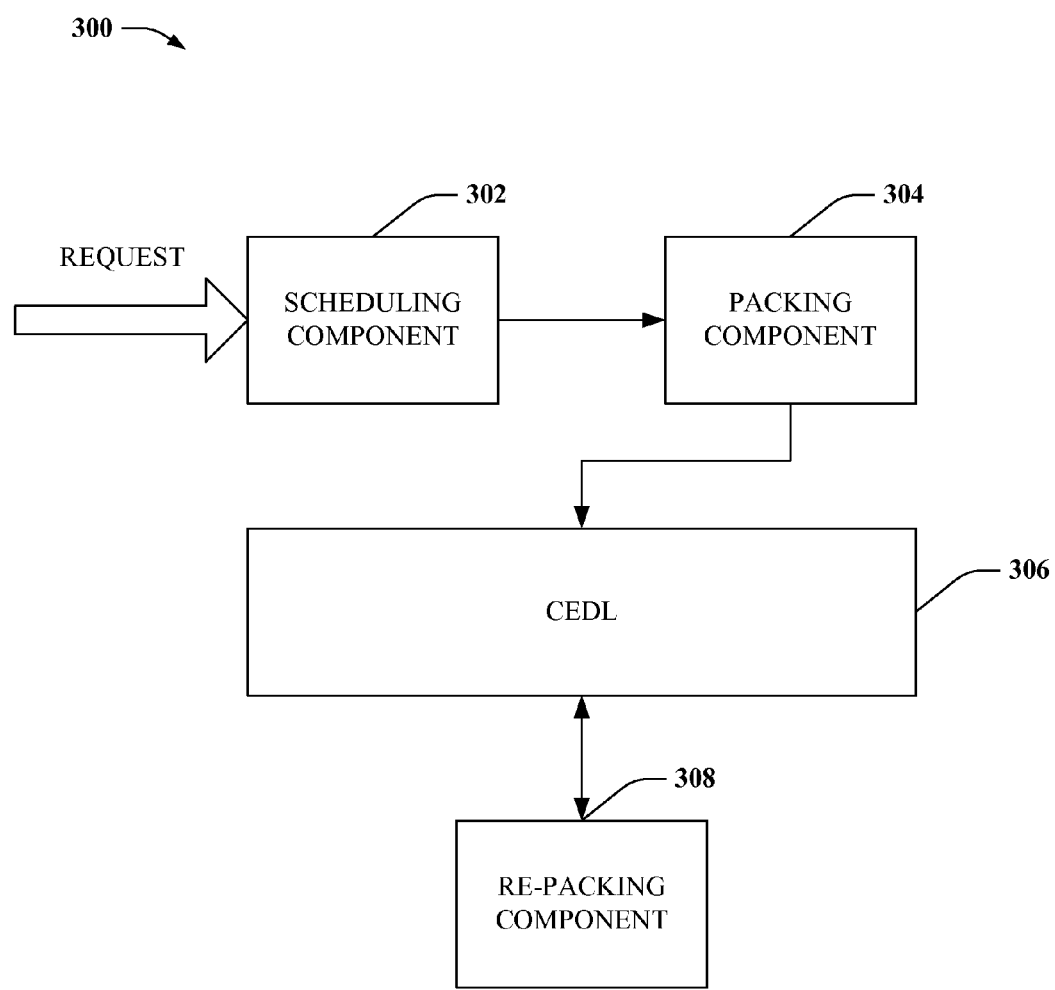
FIG. 3 depicts a block diagram of a sample system that can re-pack traffic requests within a CEDL to maintain contiguity of data, voice, and/or un-assigned channel elements (CEs).

FIG. 3 depicts a block diagram of a sample system 300 that can re-allocate traffic within a voice and data capable CEDL 306. Accordingly, system 300 can maintain contiguity of elements of the CEDL 306 that are concurrently processing data or voice traffic, and maintain contiguity of elements of the CEDL 306 that are available to process traffic. As a result, system 300 can provide more efficient utilization of CEDL resources, particularly for high bit rate data communication, by dynamically maintaining available resources of the CEDL 306 in a contiguous portion of the CEDL 306 (e.g., see FIG. 6, infra).

System 300 can include a scheduling component 302 that receives voice and/or data traffic requests, and a packing component 304 that assigns the received requests to one or more CEs of the CEDL 306 as a function of traffic type, as described herein. In addition, system 300 can include a re-packing component 308 that can shift assigned data requests within the CEDL 306 as CEs become dynamically available to (e.g., when a communication is completed, or otherwise terminates). Specifically, if one or more CEs within a contiguous portion of the CEDL (306) that is processing voice traffic becomes available, the voice requests can be shifted within the CEDL to maintain contiguity of the portion of the CEDL (306) that is processing voice traffic. Further, if a CE processing voice traffic is closer than an available CE to a portion of the CEDL (306) processing data traffic, the voice traffic can be shifted away from the data CE(s) into the available CE, effectively shifting the available CE between any CEs processing data traffic and the CEs processing voice traffic.

Alternatively, or in addition to the above, re-packing component 308 can shift a data traffic request within the CEDL 306 to maintain contiguity of CEs of the CEDL that are processing data traffic. For instance, if a data call drops out or terminates, a contiguous group of CEs formerly processing that data call can become available for processing other traffic. If that now available group of CEs separates at least one CE that is processing data traffic (e.g., bordered on both ends by other CEs processing data traffic) from another contiguous group of CEs processing data traffic, the at least one CE can be shifted within the CEDL to be contiguous with other CEs processing data traffic. More specifically, CEs processing data traffic can be shifted away from a portion of the CEDL processing voice traffic. As described above, this can effectively shift the available group of CEs within the CEDL between a contiguous group processing data traffic and another contiguous group processing voice traffic. System 300 can therefore dynamically maintain available, data-processing, and voice-processing CEs each in three contiguous portions of the CEDL. Accordingly, as CEs are freed up such CEs can be dynamically grouped together to better serve incoming data requests that require multiple contiguous CEs for processing. Thus, system 300 provides an efficient way to manage CEs of a CEDL to better support processing of voice and data traffic concurrently.

Figure 4:
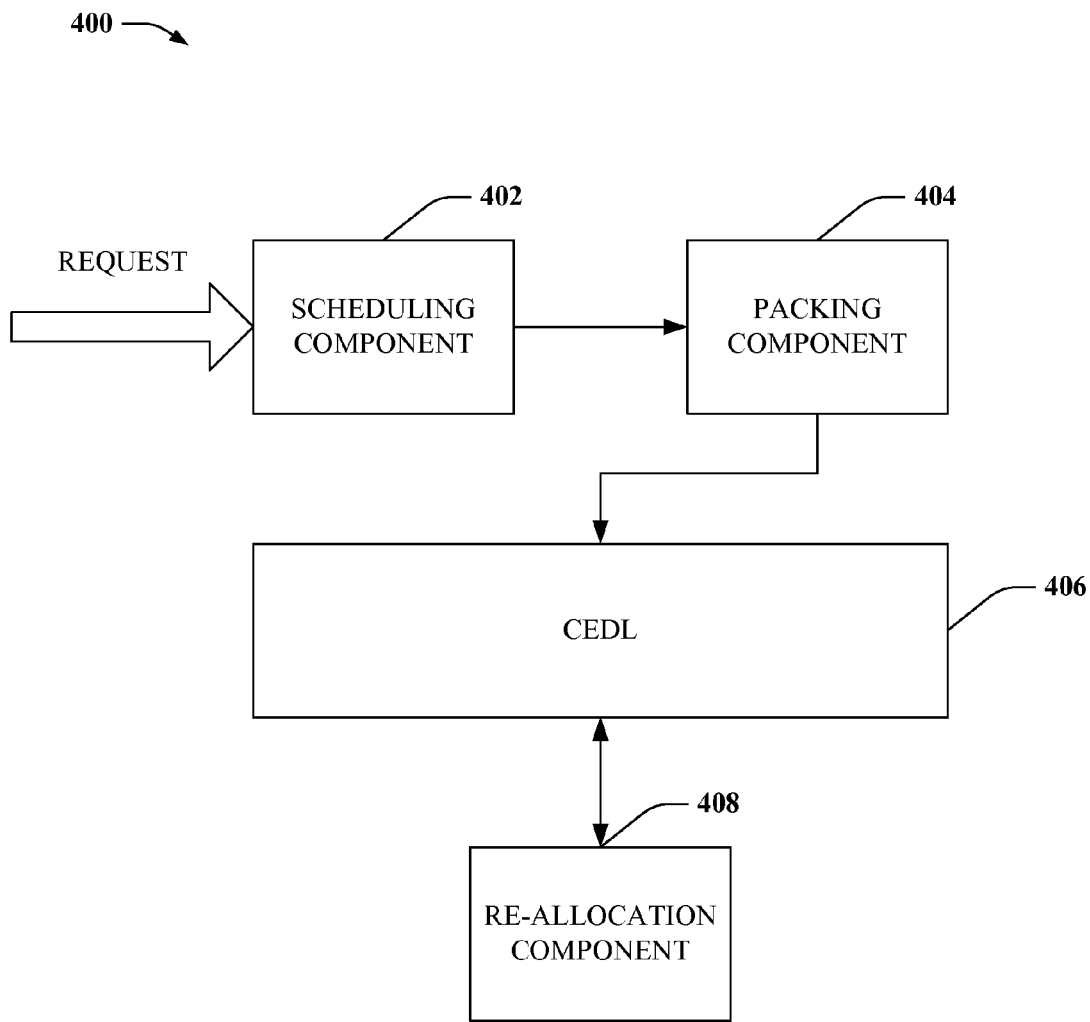
FIG. 4 illustrates a block diagram of an example system that can re-allocate data and/or voice CEs to support contemporaneous increases in data and/or voice traffic.

FIG. 4 illustrates a block diagram of an example system 400 that can re-allocate data and/or voice CEs of a CEDL 406 to support contemporaneous increases in data and/or voice traffic. CEDL 406 can process both voice traffic and data traffic concurrently. According to some embodiments of the subject disclosure, a first portion of CEDL 406 can be allocated (e.g., by packing component 404) to processing voice traffic (e.g., received by scheduling component 402) and a second portion of CEDL 406 can be allocated to processing data traffic. Such portions can be on opposite ends of the CEDL 406, for instance. In addition, a non-allocated portion of the CEDL 406 can also exist (e.g., in between the first and second portions allocated to data and voice traffic). If a contemporaneous volume of traffic exceeds available resources within the first or second portion of the CEDL 406, data and/or voice traffic can be assigned to the non-allocated portion of the CEDL 406.

According to one or more other embodiments, if a contemporaneous volume of a traffic type exceeds un-allocated processing resources and processing resources allocated to that traffic type, re-allocation component 408 can determine whether additional resources can be temporarily allocated to that traffic type. For instance, if a contemporaneous volume of data traffic exceeds un-allocated resources and data-allocated resources, the re-allocation component can determine whether any available voice-allocated resources exist. If so, one or more CEs allocated to voice traffic can be temporarily re-allocated to data traffic. Packing component 404 could then attempt to assign overflow data traffic to the re-allocated CEs. Alternatively, or in addition, if a contemporaneous volume of voice traffic exceeds available voice-allocated resources as well as un-allocated resources, re-allocation component can determine whether un-allocated data CEs exist. If so, such data CEs can be temporarily allocated to voice traffic and packing component 404 can assign voice requests to such CEs while volume of voice traffic is high. Accordingly, system 400 can provide flexibility in a CEDL management system that allocates a portion of the CEDL to voice traffic and a separate portion of the CEDL to data traffic.

Figure 5:
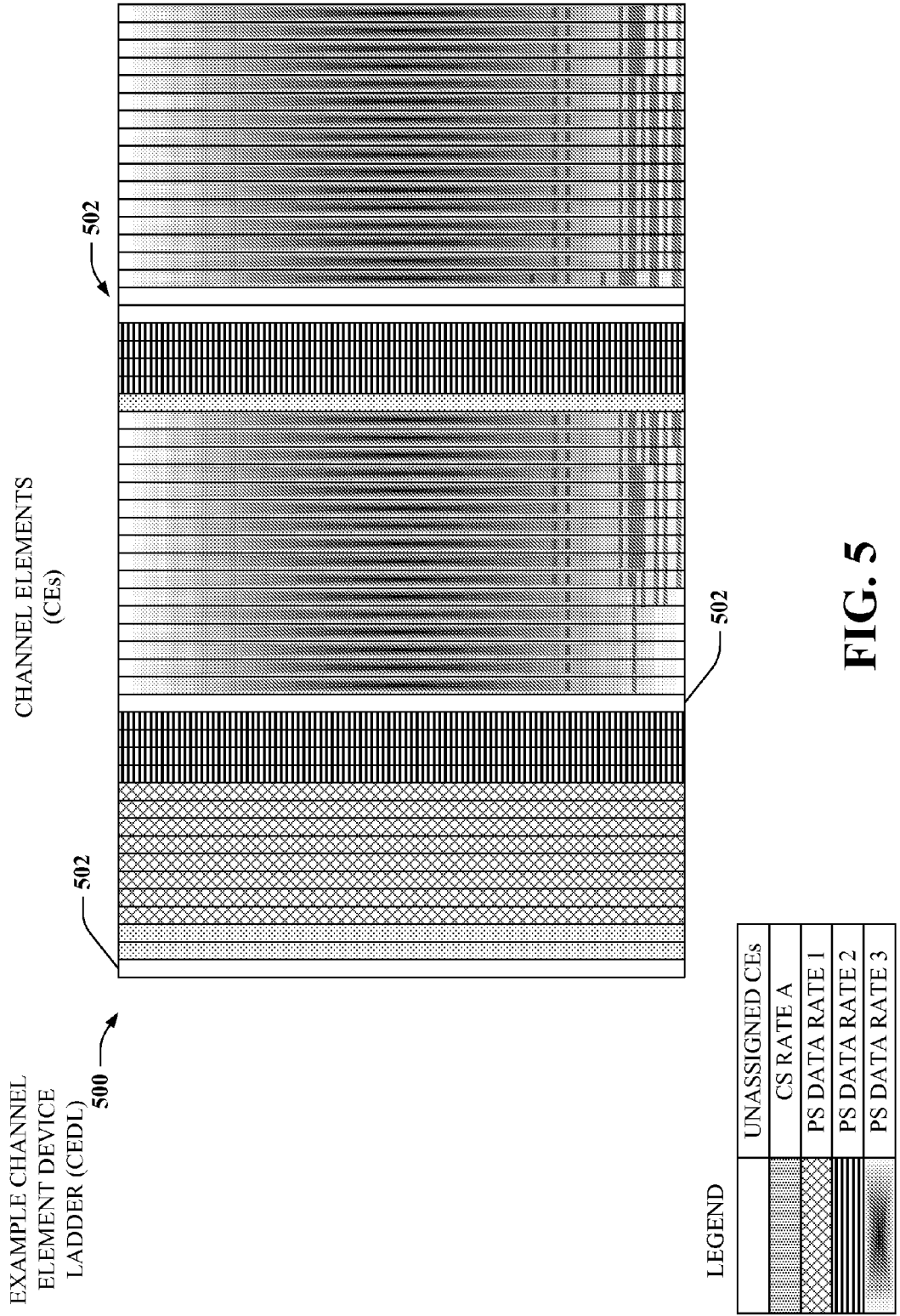
FIG. 5 illustrates an example CEDL according to one or more aspects.

FIG. 5 illustrates an example CEDL 500 having fragmented un-assigned CEs 502 according to one or more aspects. CEDL 500 can incorporate conventional control mechanisms that assign incoming traffic requests, independent of type, to one or more CEs sufficient to process the requests starting from one end of the CEDL (500) (e.g., the left) and continuing toward the opposite end (e.g., the right). One problem encountered with such conventional mechanisms is that, when a controller (not depicted) assigns traffic requests to varying numbers of contiguous CEs (e.g., to satisfy various data rates), available and/or non-assigned CEs can be fragmented within the CEDL 500. For incoming voice traffic requests, this is not necessarily a problem, because a voice traffic request can typically be allocated to any single CE, regardless of a location of such CE within the CEDL 500. However, for data requests that require multiple contiguous CEs, the CEDL 500 can only process such requests if a sufficient number of contiguous CEs are available, regardless of how many overall CEs are available. Thus, existence of fragmented available CEs within the CEDL 500 can render data requests unable to be processed, even though the CEDL 500 has a sufficient number of overall processing resources for such data request.

As a specific example of the foregoing, CEDL 500 has a total of 55 CEs, four of which are unassigned (502). The legend of FIG. 5 indicates that the 55 CEs are divided into five categories. First are the un-assigned CEs. Second are circuit-switched voice traffic CEs, assigned to voice traffic that requires a single CE to process (circuit-switched Rate A). A third category includes CEs assigned to packet-switched Rate B traffic, requiring four contiguous CEs to process. A fourth category of CEs are those assigned to packet-switched Rate C traffic, requiring eight contiguous CEs to process. The fifth category includes CEs assigned to packet-switched Rate D traffic, requiring sixteen contiguous CEs to process.

As indicated by CEDL 500, four non-assigned CEs 502 exist, at various locations within the CEDL. Fragmentation of non-assigned CEs 502 can typically occur as one or more voice calls drop out, and the CEs assigned to such voice calls dynamically become available. Although four subsequent voice calls could be assigned to the non-assigned CEs 502, no packet-switched traffic, of any data rate, can be assigned to the available CEs 502. This is because, as described herein, a single data communication typically must be processed by contiguous CEs. Accordingly, a sufficient number of resources exist in CEDL 500 to process a subsequent packet-switched Rate B request; such a request would have to be scheduled to another CEDL (500), if available, queued, or dropped. Accordingly, more efficient packing and/or re-packing of requests to CEDL 500 can result in greater utilization of processing resources.

FIG. 6 depicts an example CEDL 600 exhibiting traffic packing as a function of traffic type. For instance, as depicted by FIG. 6, voice traffic requests are packed on the left side of CEDL 600, whereas data traffic requests, of varying data rates, are packed on the right side of CEDL 600. Thus, non-assigned CEs of CEDL 600 are maintained in a contiguous portion of the CEDL 600. Accordingly, a more efficient utilization of CEs is possible according to such a packing arrangement, in contrast with that discussed supra at FIG. 5. Specifically, because non-assigned CEs are maintained in a contiguous portion of CEDL 600, the four available CEs can process either four subsequent voice calls, or a subsequent packet-switched Rate B call, in contrast to CEDL 500, supra. Accordingly, CEDL 600 exhibits a more efficient utilization of CE resources of the CEDL 600.

According to some embodiments, CEDL 600 can be a result of re-packing of dropped/terminated calls. For instance, a re-packing mechanism as described with respect to FIG. 3, supra, could shift assignment of traffic processing within a CEDL (500) to provide the assignment arrangement depicted at CEDL 600. For instance, with referring again to FIG. 5, voice traffic requests to the right of an un-assigned CE (502) can be shifted to the left of CEDL 500 to maintain a contiguous portion of CEs processing voice traffic starting from the left-most end of the CEDL as depicted by CEDL 600. Further, any data requests assigned to CEs to the left of an un-assigned CE (502) can be shifted to the right within CEDL 500 to maintain a contiguous portion of CEs processing data traffic starting from the right-most end of the CEDL. Accordingly, a CEDL (500) having fragmented un-assigned CEs can be dynamically re-packed to provide an un-fragmented CEDL (600). Thus, by way of such re-packing, a CEDL can be managed to provide more efficient processing of incoming data and voice requests.

FIGS. 7, 7A and 7B depict an example of re-packing a CEDL (700, 700A, 700B) to maintain contiguity of voice, data and/or un-assigned CEs according to further aspects. CEDL 700 has a majority of its CEs assigned to process either voice or data traffic. Voice traffic (e.g., circuit-switched Rate A traffic) is assigned to CEs at the left-most end of CEDL 700. Data traffic, of varying data rates (e.g., packet-switched Rate B, Rate C, and Rate D), is assigned to an appropriate number of contiguous CEs (e.g., four, eight and sixteen contiguous CEs) of CEDL 700, as indicated. CEDL 700 also has four non-assigned CEs maintained between CEs that are assigned to data traffic and to voice traffic.

CEDL 700A depicts a scenario where a packet-switched Rate A call, utilizing four contiguous CEs 702A within the portion of CEDL 700A assigned to various data traffic, has dropped out. The CEs 702A formerly assigned to the packet-switched Rate A call are now available to process other traffic. For instance, a total of eight voice calls can be assigned to CEDL 700A, or two packet switched Rate A calls. However, although a total of eight CEs are available to process traffic, because at most four such CEs are in one contiguous group, data traffic at a larger data rate (e.g., packet-switched Rate C) cannot be processed by CEDL 700A. Thus, an optimal utilization of available CEs is not achieved because when calls drop out, they do not necessarily do so in a manner that preserves contiguity of available CEs.

CEDL 700B depicts a scenario where a fragmented CEDL, such as CEDL 700A, is re-packed to maintain three contiguous portions of the CEDL (700B). Specifically, all voice traffic is handled by a contiguous group of CEs at the left end of the CEDL 700B. All data traffic is processed by a contiguous group of CEs at the right end of the CEDL 700B, and all non-assigned CEs are maintained in a third contiguous group of CEs 702B between the first two contiguous groups. Accordingly, subsequent data traffic or voice traffic can be allocated to one or more available CEs, starting from the left end of the contiguous group of available CEs for voice traffic or from the right end for data traffic. Specifically, referring back to CEDL 700A, all data traffic to the left of an available CE(s) (702A) can be shifted within the CEDL to the right. Shifting can occur dynamically until all concurrent data requests are processed by a contiguous group of CEs as depicted at 700B, and all non-assigned CEs are in a contiguous group 702B to the left of the data-assigned CEs. As a result of the shift and re-packing, CEDL 700B can now handle eight voice calls, two circuit-switched rate A calls, or a circuit-switched rate B call, providing more efficient utilization of CEDL (700B) processing resources for high data rate calls. As a result, more traffic can be assigned to a single CEDL at a given point in time, enabling a more efficient utilization of mobile network processing resources.

The aforementioned systems have been described with respect to interaction between several components, modules and/or mobile network functions. It should be appreciated that such systems and components/modules/functions can include those components or sub-components specified therein, some of the specified components or sub-components, and/or additional components. For example, a system could include CEDL 406, re-allocation component 408, and re-packing component 308, or a different combination of these and other components. Sub-components could also be implemented as components communicatively coupled to other components rather than included within parent components. Additionally, it should be noted that one or more components can be combined into a single component providing aggregate functionality. For instance, process management component 208 can include relay component 210, or vice versa, to facilitate identifying freed-up resources of a CEDL and updating a packing component (204) by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 8:
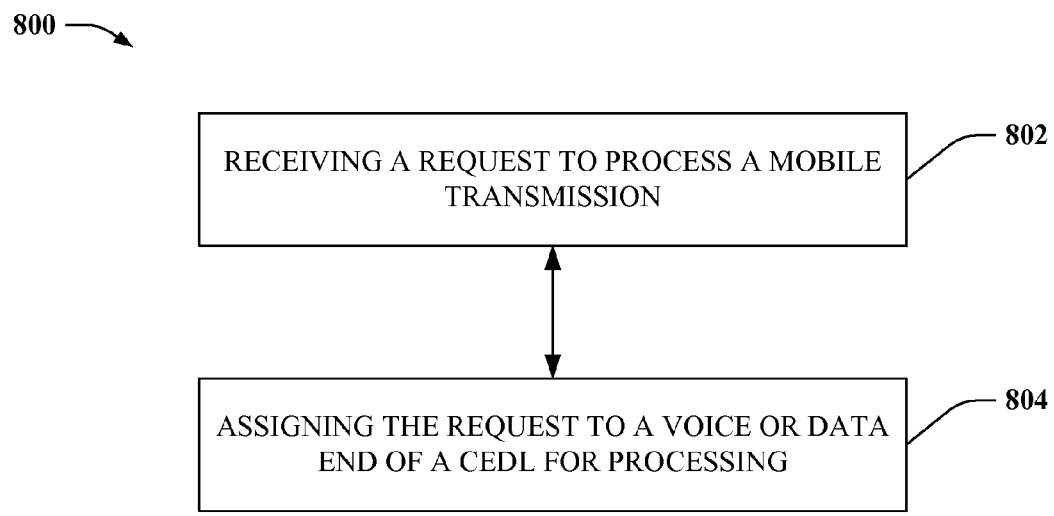
FIG. 8 illustrates a flowchart of a sample methodology for providing efficient packing of CEDL resources according to aspects of the claimed subject matter.
Figure 9:
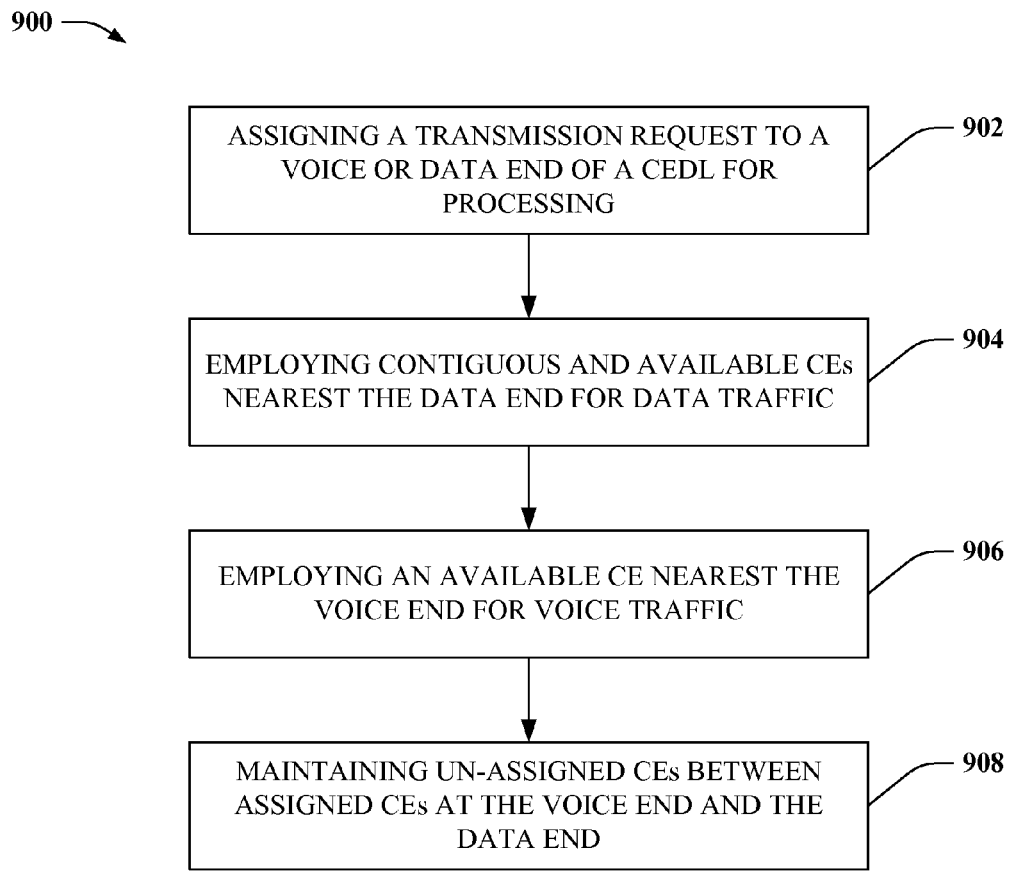
FIG. 9 depicts a flowchart of an example methodology for maintaining contiguity of CEs assigned to different types of mobile traffic.
Figure 10:
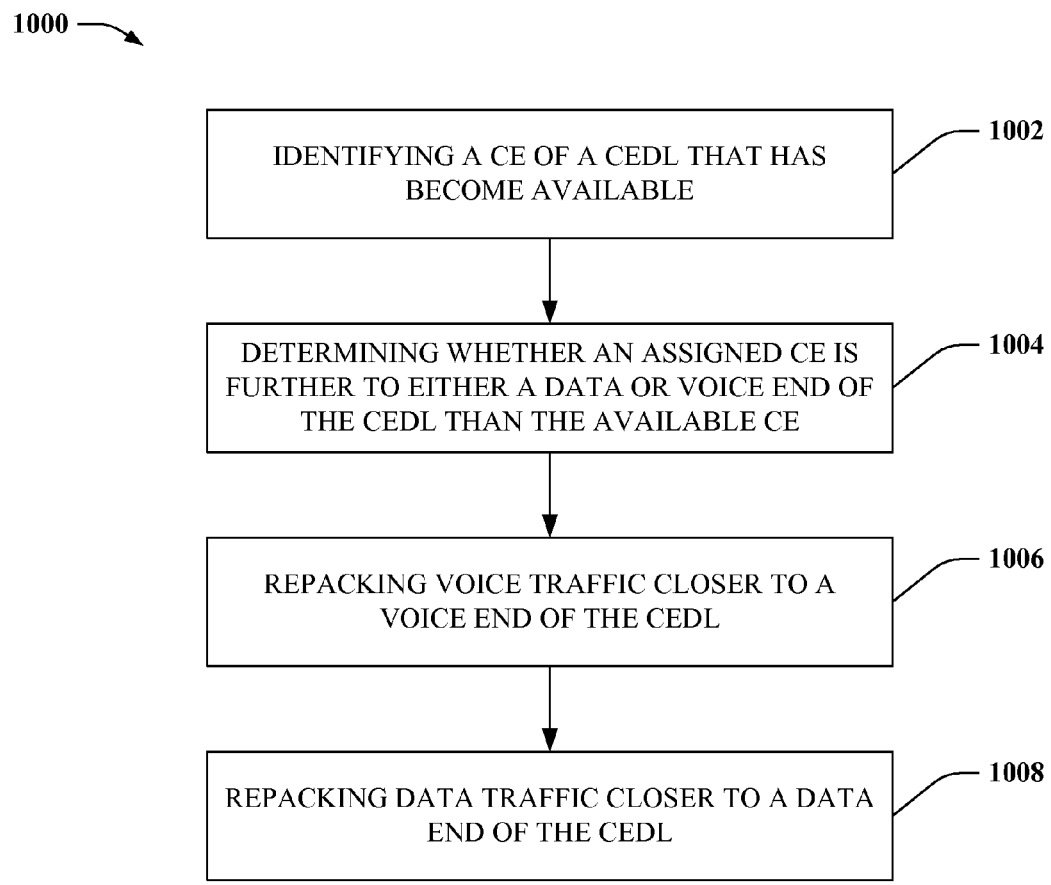
FIG. 10 illustrates a flowchart of an example methodology for providing repacking of data or voice requests to efficiently utilize CEDL resources.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

FIG. 8 illustrates a flowchart of a sample methodology 800 for providing efficient packing of CEDL resources according to aspects of the claimed subject matter. At 802, method 800 can receive a request to process a mobile transmission. The mobile transmission can include circuit-switched communication and protocols, packet-switched communication and protocols, or some suitable combination of both (e.g., circuit-switched data sent to/from an initiating device and packet-switched data sent to/from a receiving device).

At 804, method 800 can assign the received request to a voice or data end of the CEDL for processing. For instance, if the request involves a voice communication, the request can be assigned to a first available CE of the CEDL at a first end of the CEDL. If the request involves a data communication, the request can be assigned to a first available CE or contiguous group of CEs (e.g., having sufficient bandwidth to satisfy a particular data rate associated with the data request) from a second end of the CEDL, opposite the first end. Accordingly, requests can be assigned within the CEDL as a function of request type and availability. Accordingly, method 800 provides a more efficient mechanism to pack communication requests within a CEDL for processing by keeping like traffic contiguous with like traffic.

FIG. 9 depicts a flowchart of an example methodology 900 for maintaining contiguity of CEs assigned to different types of mobile traffic. At 902, method 900 can assign a transmission request to a voice or data end/portion of a CEDL for processing. For instance, a voice request can be assigned to one portion of the CEDL and a data request can be assigned to a second portion of the CEDL, as described herein. At 904, method 900 can employ contiguous and available CEs at the data end of the CEDL (e.g., farthest from the voice end) to process a data request. For instance, a sufficient number of CEs providing a data rate associated with the data request, which are available and at the data end of the CEDL, can be assigned the data request. At 906, a first available CE at the voice end of the CEDL can be assigned a voice request. At 908, un-assigned CEs can be maintained between assigned CEs at the voice end and the data end. Such maintenance can include assigning subsequent CEs to the first available CE nearest the voice end and/or group of CEs nearest the data end, as suitable. Further, such maintenance can also include shifting requests within the CEDL to maintain contiguity of CEs processing voice traffic and CEs processing data traffic. Accordingly, such a CEDL is more likely to be able to utilize all available CEs, given sufficient traffic volume, at a given point in time.

FIG. 10 illustrates a flowchart of an example methodology 1000 for providing repacking of data or voice requests to efficiently utilize CEDL resources. At 1002, method 1000 can identify a formerly assigned CE of a CEDL that has become available. Such availability can result, for instance, on termination of a call assigned to the CE, or such call dropping out, or the like. At 1004, method 1000 can determine whether a CE assigned to data traffic is closer than the formerly assigned CE to a portion of the CEDL processing voice traffic. Alternatively, or in addition, method 1000 at method 1004 can determine whether a CE assigned to voice traffic is closer than the formerly assigned CE to a portion of the CEDL processing data traffic. At 1006, voice traffic can be dynamically re-packed closer to the portion of the CEDL processing voice traffic. Such re-packing can occur, for instance, if one or more voice requests are assigned to CEs that are closer to the portion of the CEDL processing data traffic than the formerly assigned CE(s). At 1008, data traffic can be dynamically re-packed closer to the portion of the CEDL processing data traffic. In a similar manner as described above, the re-packing can occur if one or more data requests are assigned to CEs that are closer to the portion of the CEDL processing voice traffic than the formerly assigned CE(s). Accordingly, by dynamically shifting voice traffic as far to the voice end as possible, and dynamically shifting data traffic as far to the data end as possible, available CEs, whether non-assigned or formerly assigned, can be maintained in one contiguous portion of the CEDL. As a result, method 900 can facilitate more efficient utilization of available CEDL resources, as described herein.

Figure 11:
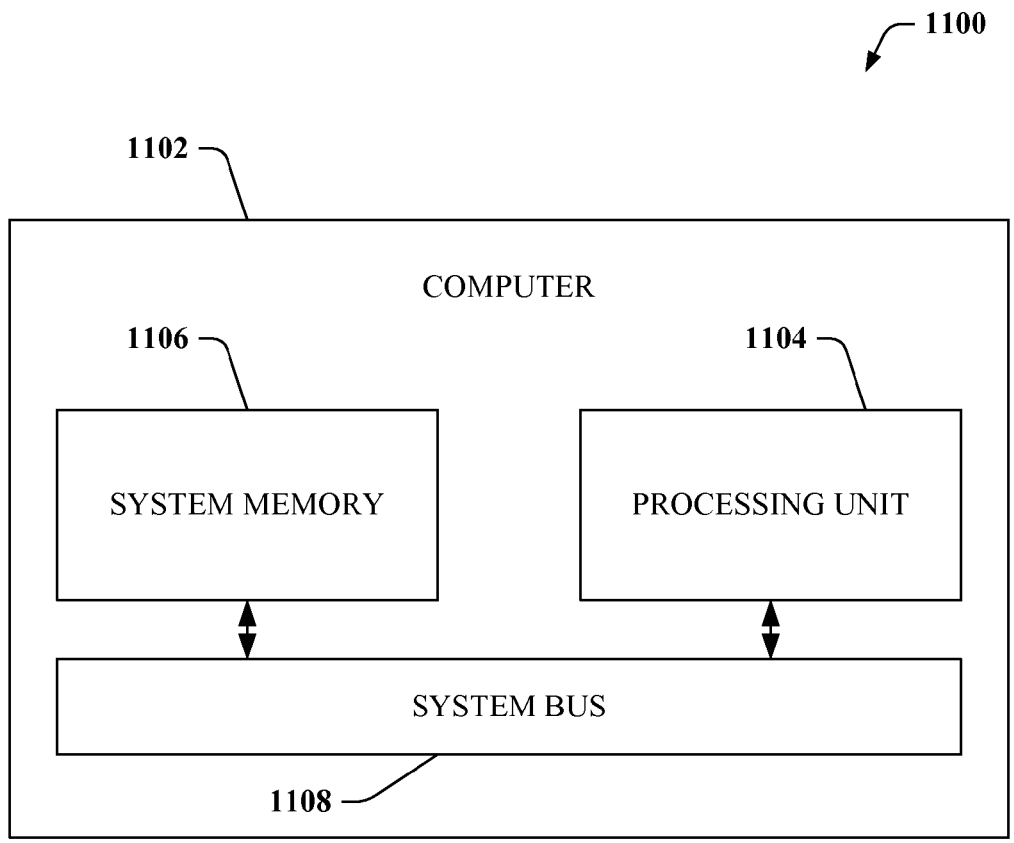
FIG. 11 depicts an example operating environment for implementing one or more aspects of the subject disclosure.

Referring now to FIG. 11, there is illustrated a block diagram of a computer 1102 operable to provide networking and communication capabilities between a wired or wireless communication network and a server and/or communication device. In order to provide additional context for various aspects of the claimed subject matter, FIG. 11 and the following discussion are intended to provide a brief, general description of a suitable computing environment 1100 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer (1102) typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors, such a single core processor, a multi-core processor, or any other suitable arrangement of processors. The system bus 1108 can be any of several types of bus structure that can further interconnect to a memory bus (with or without a memory controller), a peripheral bus, and a local bus using any of a variety of commercially available bus architectures. The system memory 1106 can include read-only memory (ROM), random access memory (RAM), high-speed RAM (such as static RAM), EPROM, EEPROM, and/or the like. Additionally or alternatively, the computer 1102 can include a hard disk drive, upon which program instructions, data, and the like can be retained. Moreover, removable data storage can be associated with the computer 1102. Hard disk drives, removable media, etc. can be communicatively coupled to the processing unit 1104 by way of the system bus 1108.

The system memory 1106 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1102 through one or more wired/wireless input devices, such as a keyboard, pointing and clicking mechanism, pressure sensitive screen, microphone, joystick, stylus pen, etc. A monitor or other type of interface can also be connected to the system bus 1108.

The computer 1102 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1102 can connect to other devices/networks by way of antenna, port, network interface adaptor, wireless access point, modem, and/or the like.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
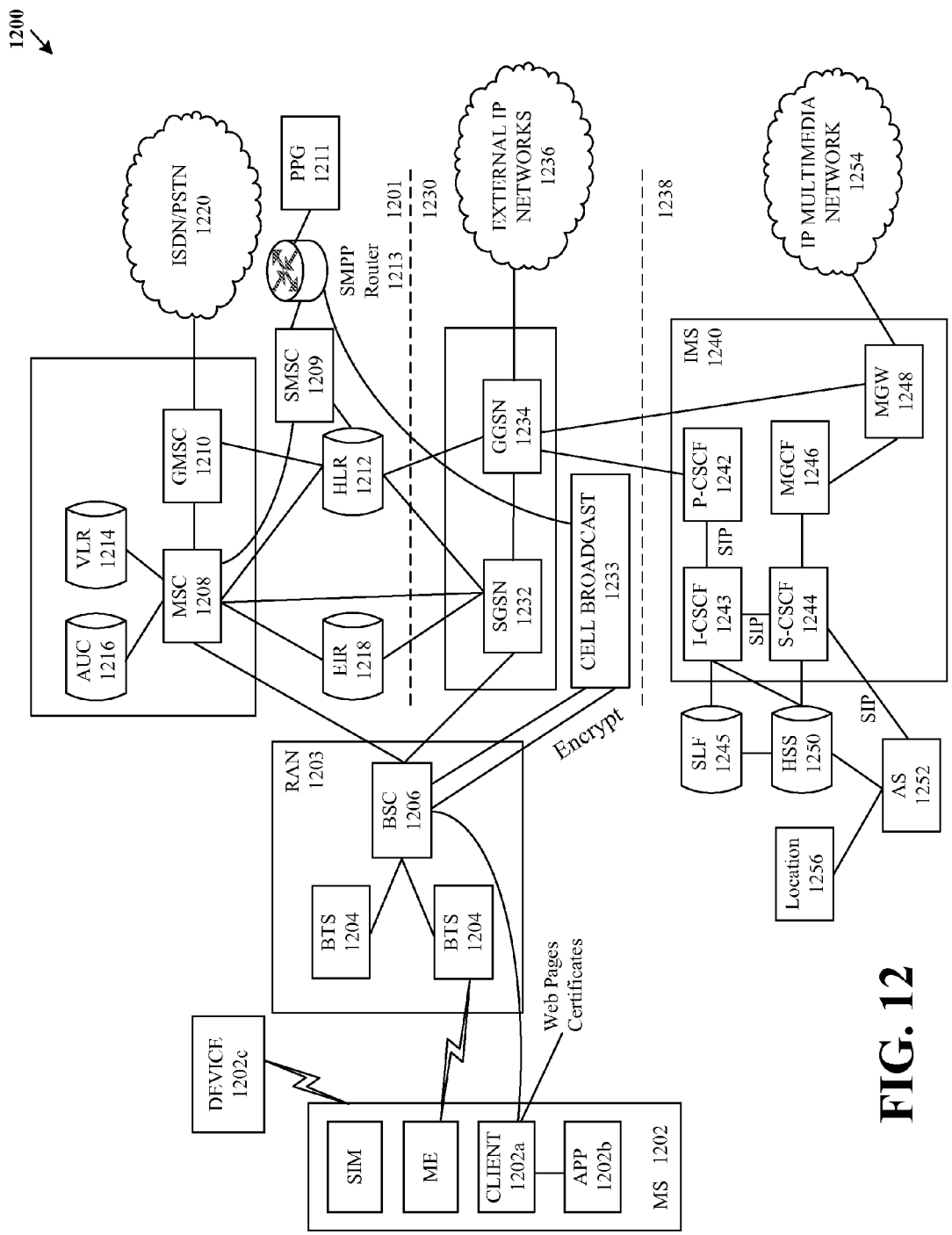
FIG. 12 depicts a sample mobile network environment that provides remote wireless communication for devices according to aspects disclosed herein.

Now turning to FIG. 12, such figure depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a can be implemented in JAVA and is discuss more fully below.

The embedded client 1202a communicates with an application 1202b that provides services and/or information to an end user. One example of the application can be navigation software that provides near real-time traffic information that is received via the embedded client 1202a to the end user. The navigation software can provide road conditions, suggest alternate routes, etc. based on the location of the MS 1202.

Those of ordinary skill in the art understand that there are many different methods and systems of locating an MS 1202.

Alternatively, the MS 1202 and a device 1202c can be enabled to communicate via a short-range wireless communication link, such as BLUETOOTH. For example, a BLUETOOTH SIM Access Profile can be provided in an automobile (e.g., device 1202c) that communicates with the SIM in the MS 1202 to enable the automobile's communications system to pull information from the MS 1202. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1202c. There can be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS can serve more than one MS. The BSC 1206 manages radio resources, including the BTS. The BSC can be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that includes selected administrative information from the HLR 1212. The VLR includes information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 can be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 can also modify an outgoing request according to a set of rules defined by the network operator (for example, address analysis and potential modification).

The I-CSCF 1243 forms an entrance to a home network and hides the inner topology of the home network from other networks and provides flexibility for selecting an S-CSCF. The I-CSCF 1243 can contact a subscriber location function (SLF) 1245 to determine which HSS 1250 to use for the particular subscriber, if multiple HSS's 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 includes a subscriber profile and keeps track of which core network node is currently handling the subscriber. It also supports subscriber authentication and authorization functions (AAA). In networks with more than one HSS 1250, a subscriber location function provides information on the HSS 1250 that includes the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane inter-working functionality (e.g., converting between AMR- and PCM-coded voice). The MGW 1248 also communicates with other IP multimedia networks 1254.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a scheduling component configured to receive a request to process traffic related at least in part to a wireless mobile device communication; and
   a packing component configured to assign the request to a first portion of a channel element device ladder allocated substantially to voice traffic in response to the request pertaining to a voice communication and to a second portion of the channel element device ladder allocated substantially to data traffic in response to the request pertaining to a data communication, wherein the channel element device ladder comprises a plurality of channel elements representative of processing components of a mobile network.

2. The system of claim 1, wherein the first portion of the channel element device ladder and the second portion of the channel element device ladder include at least one of the plurality of channel elements separated by at least one of the plurality of channel elements that are not allocated to the traffic.

3. The system of claim 1, wherein the packing component is configured to assign the request to an available channel element within the first portion that is farthest from the second portion of the channel element device ladder, in response to the request pertaining to the voice communication.

4. The system of claim 1, wherein the packing component is configured to assign the request to a minimum number of available contiguous channel elements sufficient to satisfy a data rate of the request, which are farthest from the first portion of the channel element device ladder in response to the request pertaining to the data communication.

5. The system of claim 1, wherein the first portion of the channel element device ladder and the second portion of the channel element device ladder are situated at opposing ends of the channel element device ladder.

6. The system of claim 1, wherein the packing component is configured to assign the request to an available channel element of the second portion in response to the request pertaining to the voice communication and in response to all channel elements of the first portion concurrently processing other traffic.

7. The system of claim 1, further comprising a process management component configured to identify one or more of the plurality of channel elements within the channel element device ladder, previously assigned to process a communication that have become available after completion of the communication.

8. The system of claim 7, further comprising a relay component configured to update the packing component with an identity and a location of the one or more channel elements that have become available.

9. The system of claim 7, wherein the packing component is configured to receive the identity and the location of the one or more channel elements that have become available, and assign, in response to a subsequent request pertaining to the data communication, the subsequent request to a contiguous number of available channel elements of the one or more channel elements that are sufficient to satisfy a data rate of the subsequent request and that are furthest from the first portion of the channel element device ladder.

10. The system of claim 7, wherein the packing component is configured to receive the identity and the location of the one or more channel elements that have become available, and assign, in response to a subsequent request pertaining to voice communication, the subsequent request to an available channel element of the one or more channel elements that are farthest from the second portion of the channel element device ladder.

11. The system of claim 7, further comprising a repacking component configured to shift data traffic requests assigned to channel elements that are closer to the first portion of the channel element device ladder than a channel element of the one or more channel elements that have become available, away from the first portion of the channel element device ladder, and process data traffic by a group of contiguous channel elements of the one or more channel elements.

12. The system of claim 7, further comprising a re-packing component configured to shift voice traffic requests, assigned to channel elements that are closer to the second portion of the channel element device ladder than at least one of the one or more channel elements that have become available, away from the second portion of the channel element device ladder to utilize the one or more channel elements, and a group of contiguous channel elements processes voice traffic.

13. The system of claim 1, further comprising a re-allocation component configured to temporarily designate one or more channel elements of the first portion to data traffic, in response to reception of a contemporaneous data traffic volume that requires an additional channel element to process in addition to a sum of channel elements, the sum of channel elements including a number of channel elements in the first portion plus a number of un-allocated channel elements of the channel element device ladder.

14. The system of claim 1, wherein the packing component is further configured to assign at least a portion of the request to one or more available and contiguous channel elements of the first portion in response to the request pertaining to the data communication and in response to available channel elements of the second portion being insufficient to meet a data rate of the data communication.

15. The system of claim 1, further comprising a re-allocation component configured to temporarily designate one or more channel elements of the second portion to voice traffic, in response to receiving a contemporaneous voice traffic volume that requires more channel elements to process than a number of channel elements in the second portion plus the number of un-allocated channel element.

16. A method, comprising:
receiving a request, by a computing device, to process a transmission related to mobile communication; and
assigning the request at a first end of a channel element device ladder in response to the request involving voice traffic and assigning the request at a second end of the channel element device ladder, opposite the first end, in response to the request involving data traffic, wherein the channel element device latter comprises a plurality of channel elements representative processing components of a mobile network.

17. The method of claim 16, further comprising employing a number of contiguous channel elements of the channel element device ladder, sufficient to provide a specified bit rate and that are nearest the continuous channel elements to the second end available for assignment, to process the data traffic.

18. The method of claim 16, further comprising employing a channel element of the channel element device latter that is closest to the first end and available for assignment to process the voice traffic.

19. The method of claim 16, further comprising maintaining un-assigned channel elements of the channel element device ladder between channel elements at the first end assigned to voice traffic and channel elements at the second end assigned to data traffic.

20. The method of claim 16, further comprising:
identifying a channel element of the channel element device ladder that has become available for processing as a result of ending traffic assigned to the channel element;
determining that one or more second channel elements assigned to process data traffic are further from the second end than the channel element; and
repacking the one or more second channel elements within the channel element device ladder closer to the second end in response to the one or more second channel elements being further from the second end than the channel element.

21. The method of claim 16, further comprising:
identifying a channel element of the channel element device ladder that has become available for processing as a result of completion of traffic assigned to the channel element;
determining whether one or more third channel elements assigned to process voice traffic are further from the first end than the channel element; and
repacking the one or more third channel elements within the channel element device ladder closer to the first end if the third channel elements are farther than the channel element from the first end.

22. A non-transitory computer readable storage medium having computing executable instructions that, in response to execution, cause a computing system to perform operations, comprising:
receiving a request to process a transmission related to mobile communication; and
assigning the request at a first end of a channel element device ladder in response to the request involving voice traffic and assigning the request at a second end of the channel element device ladder, opposite the first end, in response to the request involving data traffic, wherein the channel element device latter comprises a plurality of channel elements representative of processing components of a mobile network.

23. The non-transitory computer readable storage medium of claim 22, the operations further comprising:
processing the data traffic, employing a number of contiguous channel elements of the channel element device ladder closest to second end that provide a specified bit rate and that are available for assignment.

24. The non-transitory computer readable storage medium of claim 22, the operations further comprising:
identifying a channel element of the channel element device ladder that has become available for processing after termination of a request assigned to the channel element;
determining that one or more second channel elements assigned to process data traffic are farther from the second end than the channel element; and repacking requests within the channel element device ladder including shifting assigned data requests within the channel element device ladder closer to the second end in response to the second channel elements being farther from the second end than the identified channel element.

25. The non-transitory computer readable storage medium of claim 22, the operations further comprising:

employing a channel element of the channel element device ladder that is closest to the first end and available for assignment to process the voice traffic.

26. The non-transitory computer readable storage medium of claim 22, the operations further comprising:

identifying a channel element of the channel element device ladder that has become available for processing after termination of a request assigned to the channel element;

determining that one or more third channel elements assigned to process voice traffic are farther from the first end than the channel element; and repacking requests within the channel element device ladder including shifting assigned voice requests within the channel element device ladder closer to the first end in response to the third channel element being farther from the first end than the channel element.

* * * * *